United States Patent
Kahl et al.

[15] 3,705,533
[45] Dec. 12, 1972

[54] PRECIPITATION SENSOR

[72] Inventors: Gerald J. Kahl, La Mesa, Calif.;
Guido N. Guidelli Guidi, Bologna, Italy

[73] Assignees: Kahl Scientific Instrument Corporation, Cajon, Calif.; Societa Italiana Apparecchi Precisione S.p.A., Bologna, Italy; part interest to each

[22] Filed: June 23, 1970

[21] Appl. No.: 49,033

[52] U.S. Cl. .................................... 73/171, 177/94
[51] Int. Cl. ............................................ G01w 1/14
[58] Field of Search .................. 73/171; 177/94–97, 177/102, 115; 335/205, 206; 200/61.04

[56] References Cited

UNITED STATES PATENTS

| | | | |
|---|---|---|---|
| 606,601 | 6/1898 | Thayer et al. | 177/94 X |
| 2,202,452 | 5/1940 | Hildabrand | 73/171 |
| 3,243,999 | 5/1966 | Barker | 73/171 |
| 3,465,327 | 9/1969 | Schroter | 335/205 X |
| 3,322,917 | 5/1967 | Furlow | 335/205 X |

FOREIGN PATENTS OR APPLICATIONS

| | | | |
|---|---|---|---|
| 505,379 | 5/1939 | Great Britain | 177/94 |
| 180,834 | 8/1966 | U.S.S.R. | 73/171 |

*Primary Examiner*—Richard C. Queisser
*Assistant Examiner*—Marvin Smollar
*Attorney*—Michael S. Striker

[57] ABSTRACT

A precipitation sensor having two buckets secured to each other for tilting movement between two end positions, is provided with a precipitation collecting and distributing means which collects precipitation during tilting of the buckets and has a normally closed valve operated by the buckets to open when the same are in the end positions so that the collected precipitation is alternately discharged into the buckets. Evaporation retarding covers with small inlet cutouts close the tops of the buckets, adjustable elastic abutments stop the buckets without bouncing back, and magnetic switch means generate a counting pulse for each tilting movement.

12 Claims, 5 Drawing Figures

PATENTED DEC 12 1972 3,705,533
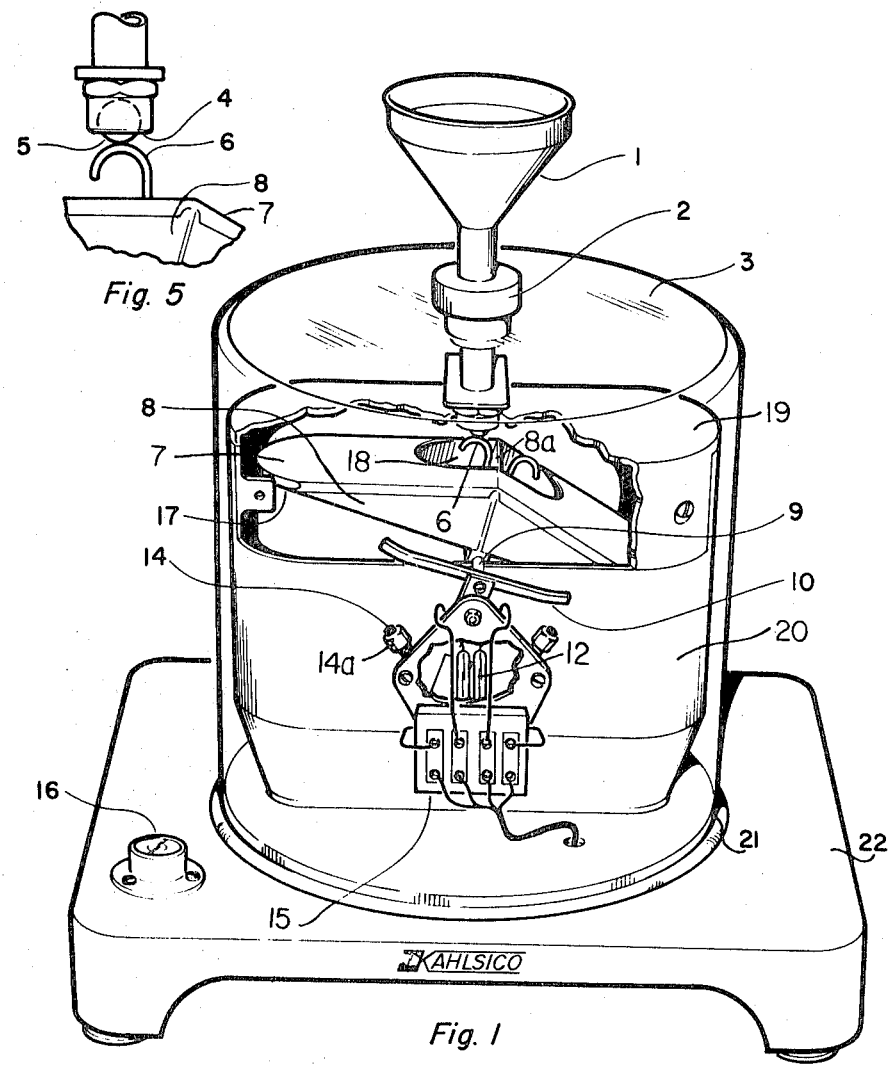
Fig. 5
Fig. 1
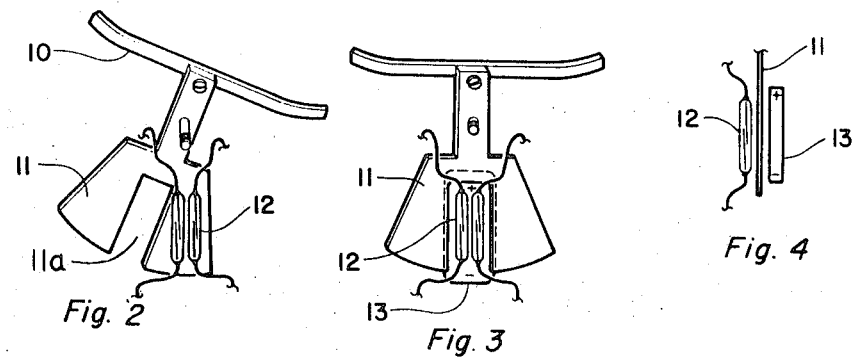
Fig. 2
Fig. 3
Fig. 4
INVENTORS:
GERALD J. KAHL
BY GUIDO N. GUIDELLI GUIDI
Michael S. Striker
Attorney

PRECIPITATION SENSOR

BACKGROUND OF THE INVENTION

Precipitation sensors having a pair of tilting buckets are known which alternately receive precipitation from a collecting funnel, and are tilted when a predetermined amount of precipitation has accumulated in either bucket. During the tilting movement, the precipitation is not reliably guided into one or the other bucket, which influences the accuracy of the measured amount of precipitation. Furthermore, the buckets are open which causes evaporation of the accumulated precipitation from the buckets whereby the accuracy of the measurement is impaired particularly during periods when little precipitation falls.

SUMMARY OF THE INVENTION

It is an object of the invention to overcome the disadvantages of tilting bucket sensors according to the prior art, and to provide a precipitation sensor which accurately measures the amount of precipitation.

Another object of the invention is to provide a precipitation sensor of the tilting bucket type in which precipitation is accumulated alternately in two buckets, collected during the tilting movement of the buckets, and discharged into one or the other bucket when the same are in an end position.

Another object of the invention is to prevent evaporation of accumulated precipitation from the buckets.

Another object is to count the tilting movements of the buckets by magnetic switch means without substantially increasing the mass of the tilting parts of the apparatus.

Another object of the invention is to prevent bouncing of the buckets when stopped in end positions.

With these objects in view, a precipitation sensor according to the invention comprises supporting means, preferably including a housing; precipitation collecting and distributing means mounted on the supporting means having an inlet and an outlet for precipitation, and including valve means, preferably a check valve, in the outlet; first and second buckets secured to each other mounted on the supporting means for tilting movement together between a first position in which the inlet portion of the first bucket is located under the outlet, and a second position in which the inlet portion of the second bucket is located under the outlet; valve actuating means, preferably including two actuators respectively secured to the first and second buckets for opening the valve means in the first and second positions of the buckets, and for effecting closing of the valve means during the tilting movement of the buckets; and counting means, preferably a magnetic pulse generator, operated by the buckets during each tilting movement.

In the first position, precipitation is accumulated in the first bucket, while the second bucket discharges accumulated precipitation through a spout. In the second position, precipitation is accumulated in the second bucket, while the first bucket discharges accumulated precipitation.

Precipitation flows through the outlet of the collecting and distributing means into one or the other bucket, depending on in which end position the buckets are located. In an intermediate position of the buckets assumed during tilting of the same, the actuating means do not engage the valve member so that the valve closes and any precipitation occurring during this time, is collected until the valve opens again and the collected precipitation can flow into one of the buckets.

The buckets are preferably closed by evaporation retarding covers which have small cutouts respectively located under the valve controlled outlet in the two end positions of the buckets. The two actuators are secured to the buckets, respectively, and project out of the inlet cutouts of the covers into the region of the valve means.

In the preferred embodiment of the invention, the tilting buckets are connected by a shaft with a shielding plate provided with a cutout which permits the flux of a permanent magnet to actuate a magnetic switch when the buckets assume an intermediate position during the tilting movement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a perspective front view, partly broken off, and illustrating an embodiment of the invention;

FIG. 2 is a fragmentary perspective front view illustrating a magnetic switch device used in the embodiment of FIG. 1;

FIG. 3 is a fragmentary front view illustrating the magnetic switch device in an operative condition;

FIG. 4 is a fragmentary side elevation of the switch device; and

FIG. 5 is a fragmentary front elevation illustrating a detail of the embodiment of FIG. 1.

DESCRIPTION OF THE PREFERRED EMBODIMENT

Referring now to the drawing, a supporting base 22 is provided with a level vial 16 by which the horizontal position of its top plate can be ascertained. A circular recess 21 receives the lower end of a pot-shaped cover 3 which encloses a supporting housing 20 having a detachable top portion. An inlet funnel 1 is mounted by means of a fitting 2 on the top plate of the protective dust cover 3, and terminates in a valve assembly mounted on the top plate 19 of housing 20. As best seen in FIG. 5, the valve assembly includes a valve housing 4 with a circular seat on which a light ball 5 rests due to the action of the force of gravity, or due to the provision of a small spring, not shown. When the check valve 4, 5 is in the normal closed position, precipitation falling into funnel 1 is collected in the same, but when check valve 4, 5 is opened by lifting ball 5, the collected precipitation flows out of the outlet of the check valve into inlet cutouts 18 in top covers 7 of tilting buckets 8. Consequently, the assembly 1, 2, 4, 5 constitutes a means for collecting and distributing precipitation.

The buckets 8 are separated by a common wall 8a and have substantially slot-shaped spouts 17 at the outer ends of the buckets. A shaft 9 projects from the buckets in the plane of the common wall 8a, and is mounted for angular movement with the buckets 8 in bearings of the walls of housing 20.

An actuator 6 is secured in the interior of each bucket 8 and has a curved portion projecting out of the inlet cutouts 18 of the cover plates 7 of buckets 8, so that, when the buckets tilt about the axis of shaft 9, the curved free ends of actuators 6 move along a circular path into the region of ball 5 of the check valve.

In the end position shown in FIG. 1, the left bucket 8 receives precipitation from the outlet of check valve means 4, 5 whose valve member 5 is lifted from its seat by the respective actuator 6. Since the radius of curvature of the curved free end of each actuator 6 is smaller than the radius of curvature of the path along which the actuators 6 move during tilting of the buckets, the frictional contact between the actuators 6 and ball 5 is minimal, and the ball 5 is not substantially worn off even after prolonged use. Since ball 5 retains its shape, leakage from the valve 4, 5 due to wear is prevented.

When a certain amount of precipitation has accumulated in the left bucket 8, the center of gravity of the tiltable buckets is displaced so that the buckets 8 tilt together in counterclockwise direction out of the position illustrated in FIG. 1 to another end position in which the inlet cutout 18 of the other bucket 8 is located under the outlet of the valve means 4, 5. In this second end position of the buckets, the actuator 6 of the bucket on the right engages the ball 5 of check valve 4, 5, and opens the same so that precipitation flows through the outlet of the valve means into the bucket on the right as viewed in the drawing. During the tilting movement from one to the other end positions, the buckets 8 assume a position in which none of the actuators 6 engages ball 5 so that the check valve 4, 5 closes and permits no precipitation to flow into the buckets, or onto the common separating wall 8a.

As compared with the prior art in which the funnel 1 is connected by an open tube with the buckets, the prior art construction causes errors in the measurement when the bucket is in motion due to the fact that it is already filled to the proper amount. Excessive precipitation entering the filled bucket is then not measured, and some precipitation is lost in the prior art constructions by striking the common separating wall 8a.

Due to the above-described operation of the precipitation collecting and distributing means 1, 2, 4, 5 by the actuator means 6, precipitation is collected during the tilting movement of the buckets, and discharged into one or the other bucket when the same are in end positions.

The buckets 8 are made of lightweight metal rather than of a plastic material in order to assure geometric constancy of shape and calibration.

The top covers 7 retard evaporation of precipitation accumulated in the buckets, and the inlet cutouts 18 in the same are as small as possible, and have such a size that the outlet of the valve 4, 5 is located about one or the other inlet cutout 18 in the two tilted end positions of the buckets 8. It is evident that open buckets according to the prior art will have a higher evaporation than the closed buckets of the invention, which will influence the measured amount of precipitation, and consequently the accuracy of the measurement. Since the function of the sensor is to actuate other mechanism at the occurrence of a specific volume of accumulated precipitation, any liquid lost due to evaporation would cause an error in measurement.

When sufficient precipitation is accumulated in one of the buckets to displace the center of gravity sufficiently in relation to the axis of shaft 9, buckets 8 tilt, and the actuator 6 momentarily releases the ball 5 of check valve 4, 5 so that the same closes. The filled bucket is turned to an inclined position in which it discharges the accumulated precipitation through the spout 17.

Shaft 9, which turns with buckets 8 carries at the free end thereof, two diametrically disposed stop arms 10 which respectively cooperate with elastic abutments 14 whose positions can be adjusted by threaded nuts 14a.

At the end of each tilting movement, one of the stop arms 10 abuts the elastic abutment 14 and stops the buckets 6 in one end position. Depending on the adjustment of the abutments 14, the angle of tilting will be greater or smaller, which correspondingly influences the amount of precipitation which can be accumulated in each bucket 8 before the buckets turn to the other end position.

The elastic abutments 14 have the advantage that the stop arms 10, and the buckets 8 connected with the same by shaft 9, will not bounce back after each tilting movement of the buckets 8.

A permanent magnet 13 is secured to a wall of housing 20 in a vertical position, and is preferably located in the vertical plane passing through the axis of shaft 9, in which also the outlet of the precipitation collecting and distributing means 1, 2, 4, 5 is located.

Registering with permanent magnet 13 in the same vertical plane, is a pair of parallel magnetic dry reed switches 12, best seen in FIGS. 2 and 3, which are connected in parallel. A non-magnetizable shielding plate 11 is secured to shaft 9 and stop arms 10, and is formed with a cutout 11a which registers with the permanent magnet 13 and the magnetic switch means 12 in the position of FIG. 3 when the buckets 8 momentarily assume a central position in which the common partitioning wall 8a is located in a vertical plane. In the two tilted end positions, the shielding plate 11 and its cutout 11a are in the position shown in FIG. 2, and in a symmetrical position, not shown, in which portions of the non-magnetizable shielding plate 11 are located between the permanent magnet 13 and the magnetic switch means 12. In these positions, the flux of magnet 13 cannot penetrate to the magnetic switches 12, and the same remain open. In the central position shown in FIG. 3, the magnetic flux of permanent magnet 13 passes through the cutout 11a to the magnetic switch means 12 and closes the same so that a counting impulse is generated which is counted by suitable means which register the number of tilting movements of the buckets so that the total accumulated and discharged precipitation can be calculated.

While a single magnetic switch 12 would be sufficient, it is preferred to provide two magnetic switches 12 connected in parallel into the circuit, not shown, so that the generation of counting pulses is continued even if one of the switches fails.

Hermetically closed magnetic switches are used which assure a long-term operation by a mechanism having a small mass which improves the reliability of the apparatus and furnishes reproduceable and accurate measurements. Unlike mercury switch systems, the mass to be shifted with each tilting movement is very small, which improves the sensitivity of the sensor. Unlike in mechanical switches, there is no minimum force or change in inertia associated with the dry reed switches used in accordance with the invention.

By using a lightweight non-magnetizable shielding plate 11, instead of mounting the heavy permanent magnet directly on the shaft of the buckets, the weight and inertia of the heavy magnet has no influence on the tilting movement, and the mass of the lightweight shielding plate 11 is negligible. Due to the fact that the switch 12 is mounted in a vertical position, the actuation of the switch is effected during the middle of the tilting motion when the buckets pass through an intermediate vertical position. In prior art arrangements, horizontally mounted switches are used which are actuated at the end of each tilting circle, which causes errors due to the bouncing back of the bucket assembly and of the switch actuator, causing multiple switch closures. Since in accordance with the invention, only one switch actuation takes place during each tilting movement, no errors due to bouncing back can take place, and furthermore, bouncing back of the tilting bucket assembly is reduced or prevented by provision of the elastic abutments 14.

Electrical connections are made at a terminal board 15 so that electrical counters or recording means may be used to monitor the number of tilting motions of bucket assembly 8 and thus determine the total amount of precipitation in a given period of time. By choosing the proper funnel 1 of the precipitation collecting and distributing means, measurements can be obtained in increments of 0.01 inch of precipitation.

It will be understood that each of the elements described above, or two or more together, may also find a useful application in other types of precipitation sensors differing from the types described above.

While the invention has been illustrated and described as embodied in a precipitation sensor having means for collecting precipitation during tilting of buckets, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Precipitation sensor comprising, in combination, supporting means; precipitation collecting and distribution means having an inlet and an outlet for precipitation; bucket means including first and second buckets secured to each other and mounted on said supporting means for tilting movement together between a first position in which an inlet portion of said first bucket is located under said outlet for accumulating of said precipitation while said second bucket discharges accumulated precipitation, and a second position in which an inlet portion of said second bucket is located under said outlet for accumulating precipitation while said first bucket discharges accumulated precipitation; and counting means operated by said bucket means during each tilting movement, said counting means including magnet means carried by said supporting means, magnetic switch means mounted on said supporting means aligned with said magnet means in a vertical plane, and a non-magnetizable shielding plate secured to said bucket means for angular movement therewith and having a cutout registering with said magnetic switch means and said magnet means in said vertical plane during tilting movement of said bucket means to generate a counting pulse by permitting magnetic flux to flow from said magnet means to said magnetic switch means.

2. Precipitation sensor as defined in claim 1, and including valve means in said outlet so that precipitation is collected while said valve means is closed and discharged while said valve means is open, and valve actuating means secured to said bucket means for opening said valve means in said first and second positions of said bucket means and for effecting closing of said valve means during tilting movement of said bucket means between said first and second positions.

3. Precipitation sensor as claimed in claim 2 wherein said valve means includes a valve member biassed to move to a closed position; and wherein said actuator means engage and open said valve member in said first and second positions of said bucket means, and release said valve member for movement to said closed position at the beginning of said tilting movement so that said valve member closes said valve means when neither of said inlet portions is located under said outlet.

4. Precipitation sensor as claimed in claim 3 wherein said valve means is a check valve; wherein said valve member is a ball biassed at least by gravity to move to said closed position; and wherein said actuator means is located under said valve member and lifts the same to open said valve means when said bucket means is in said first and second positions.

5. Precipitation sensor as claimed in claim 2 wherein said valve means is a normally closed check valve; wherein said actuator means includes a first actuator secured to said first bucket and a second actuator secured to said second bucket spaced from said first actuator; wherein said first actuator engages and opens said valve means in said first position and said second actuator engages and opens said valve means in said second position; and wherein said valve means is located between said first and second actuators during tilting movement of said bucket means between said first and second positions, and is closed.

6. Precipitation sensor as claimed in claim 5 wherein said valve means has a movable valve member; wherein each of said actuators has an engaging portion moving along a curved path during tilting movement of said bucket means; and wherein each engaging portion is curved at a smaller radius of curvature than the respective path so that only a small surface portion of said valve member is engaged by each engaging portion.

7. Precipitation sensor as claimed in claim 1 wherein said supporting means include a supporting housing in which said bucket means is located; wherein said bucket means includes a horizontal shaft mounting said first and second buckets on said supporting housing for angular tilting movement about an axis between said first and second positions; and wherein said collecting and distributing means is mounted on said housing in a vertical plane passing through said axis of said shaft.

8. Precipitation sensor as claimed in claim 7 wherein said shaft is fixedly secured to said bucket means and turnably mounted on said housing; wherein at least one end of said shaft projects out of said housing; and wherein said shielding plate is secured to said shaft end.

9. Precipitation sensor as claimed in claim 8 wherein said magnetic switch means are located in said vertical plane, said permanent magnet means being fixedly supported by said housing in said vertical plane.

10. Precipitation sensor as claimed in claim 1 wherein said magnetic switch means include two adjacent parallel reed switches simultaneously operated by said permanent magnet means and connected in parallel whereby a counting pulse is generated even if one of said switches fails.

11. Precipitation sensor comprising a housing; precipitation collecting and distributing means mounted on said housing and having an inlet and an outlet for precipitation and including a normally closed check valve in said outlet so that precipitation is collected while said valve is closed and discharged when the same is opened; bucket means including first and second buckets secured to each other and a horizontal shaft mounting said buckets on said housing for angular tilting movement about the shaft axis between a first position in which an inlet portion of said first bucket is located under said outlet for accumulating precipitation while said second bucket discharges accumulated precipitation and a second position in which an inlet portion of said second bucket is located under said outlet for accumulating precipitation while said first bucket discharges accumulated precipitation, said collecting and distributing means being located substantially in a vertical plane passing through said shaft axis; valve actuating means comprising a first actuator secured to said first bucket and engaging and opening said valve in said first position of said bucket means, and a second actuator secured to said second bucket and engaging and opening said valve in said second position of said bucket means, said valve being located between said actuators during tilting of said bucket means and closed during such tilting movement; and counting means operated by said bucket means during each tilting movement and comprising magnetic switch means located in said vertical plane, permanent magnet means fixedly supported by said housing in said vertical plane, and a non-magnetizable shielding plate secured to said shaft for angular movement therewith and having a cutout registering with said magnetic switch means and said permanent magnet means in said vertical plane during tilting movement of said bucket means, whereby flux flowing from said permanent magnet means through said cutout in said plate energizes said magnetic switch means to generate an electric counting pulse.

12. Precipitation sensor as defined in claim 11, wherein said bucket means include first and second evaporation retardation covers on top of the first and second buckets, respectively, said first and second covers having first and second inlet cutouts respectively forming said inlet portions and being respectively located under said outlet means when said bucket means are in said first and second positions.

* * * * *